Aug. 11, 1942.   C. T. O'CONNOR   2,292,711
WIRE LINE SOCKET AND TOOL LATCH
Filed Jan. 22, 1941
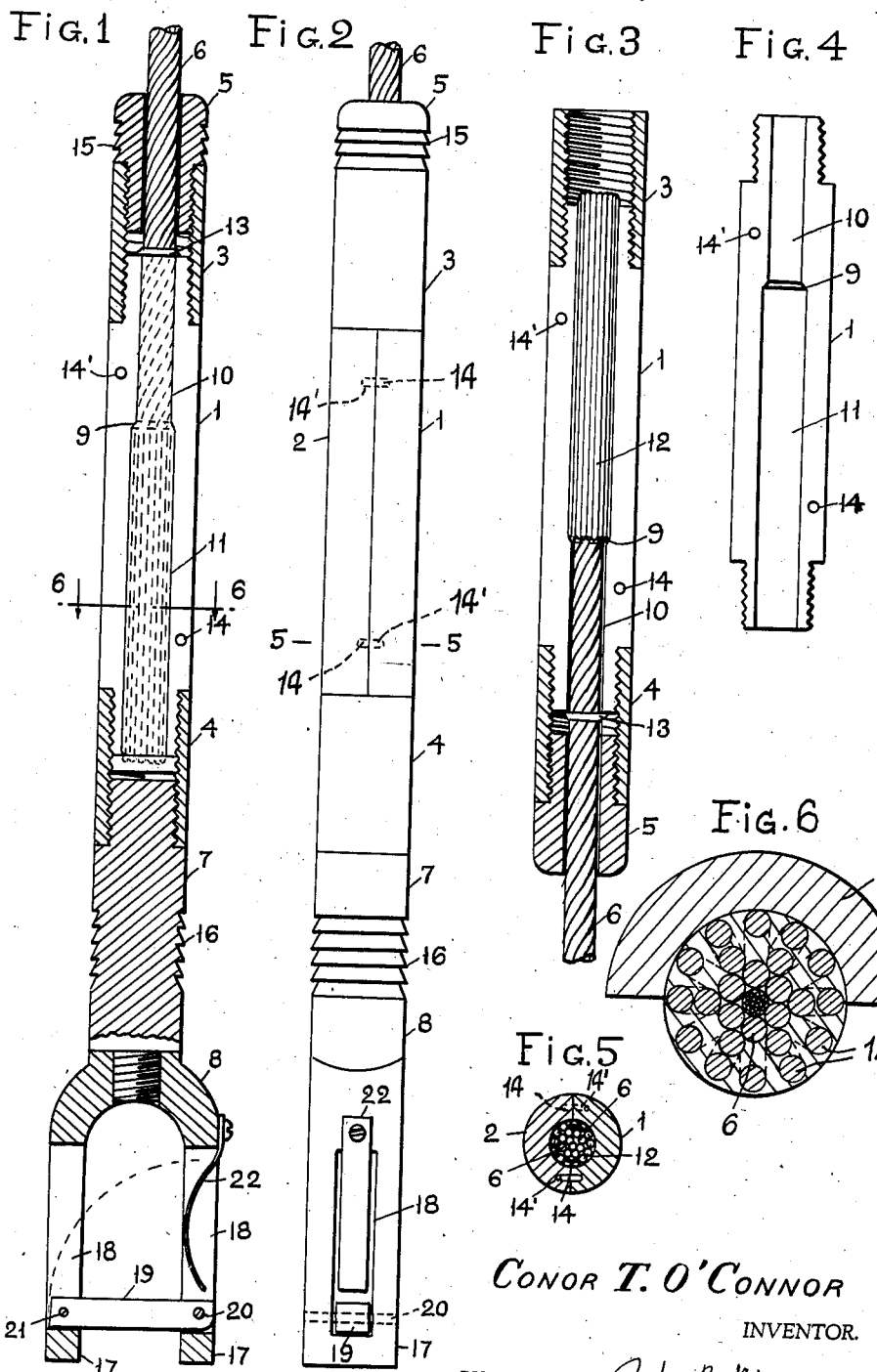
CONOR T. O'CONNOR
INVENTOR.
BY John P. Nixonow
ATTORNEY Patented Aug. 11, 1942

2,292,711

UNITED STATES PATENT OFFICE 2,292,711

WIRE LINE SOCKET AND TOOL LATCH

Conor T. O'Connor, Trinidad, British West Indies

Application January 22, 1941, Serial No. 375,460

5 Claims. (Cl. 24—123)

My invention relates to wire line or cable sockets and tool latches and has particular reference to devices for attaching various tools to the end of a wire cable, particularly tools used in the oil well industry.

In the operation of oil wells it is often necessary to rig up a steel line or cable in connection with the crown block in a derrick and with or without other blocks for handling various tools and devices lowered into the well or extracted therefrom. The end of the cable, after having been passed over the crown pulley, is attached to a tool or device, such as a traveling block, bailer, sinker bar, swab, oil and water well coring equipment, oil and water well surveying equipment, or to other equipment used in drilling oil wells.

For some of this equipment the end of the cable must be fitted and babbitted into a socket, the latter being threaded for holding a particular tool; for other purposes, the cable must be cut off from the socket and tied to the particular tool or device.

The ordinary arrangement of babbitting the end of the cable in the socket has a disadvantage in that the socket must be cut off from the cable every time the cable is placed on the crown block or removed therefrom; also, when it is necessary to attach the end of the cable to a device which cannot be held by the socket and to which the free end of the cable is tied. Such frequent changes involve the loss of time and gradual shortening of the valuable wire cable.

My invention has for its object to provide a split socket with a counterbore inside into which the end of a cable is babbitted. The ends of the socket are screwed into couplings whose outer ends are used for attaching other parts; at the rear end where the cable leaves the socket, a protective bushing is provided, and at the front end a tool latch may be fitted into the coupling.

The advantage of my socket is that it can be easily taken apart, so as to free the babbitted end of the cable, and the latter can be then passed over the crown block, so that it is not necessary to cut off the end of the cable once it is babbitted.

Another object of my invention is to provide a tool latch detachably connected to the end of the socket, the latch having a self-opening and self-locking bar at the end to facilitate the engagement of handles, yokes or loops on various tools and devices.

My invention is more fully described in the accompanying specification and drawing, in which:

Fig. 1 is an assembly view showing one of the sections of a split tubular member used herein removed, other parts in longitudinal section and the cable in elevation.

Fig. 2 is a side view of the same;

Fig. 3 is a sectional view of the socket with the end of the cable in an inverted position ready to be babbitted;

Fig. 4 is a detail view of one half of the socket;

Fig. 5 is a sectional view of the socket taken on the line 5—5 of Fig. 2.

Fig. 6 is an enlarged section on the line 6—6 of Fig. 1.

My wire line socket consists of a tubular member longitudinally split into two portions or halves 1 and 2, the ends of the tubular member being threaded for couplings 3 and 4. The upper or inner coupling 3 has a protecting bushing 5 for a steel cable or line 6. The outer or lower coupling 4 is threaded for the end of the shank 7 of a tool latch 8.

The tubular portion of the socket has a shoulder 9 inside, defining a small bore or hole 10 from a larger bore or hole 11. The bore 10 is slightly larger than the diameter of the cable, so that the latter can be easily inserted into the socket. The end of the cable is unlaid, the hemp core removed, and the unwound ends of the wires bent back as shown at 12 in Fig. 3, the enlarged end formed by the bent back wires of the cable being then drawn into the larger bore 11.

The socket is then preheated and filled with molten babbitt while holding the socket with the cable in an inverted position, as shown in Fig. 3. The end of the cable is thus held fast in the socket. A yarn 13 or similar packing material is wrapped around the cable at the end of the socket, in order to prevent the babbitt from getting into the threads of the coupling. It can be easily removed, however, for instance, by unscrewing the couplings 3 and 4 and separating the two halves 1 and 2. The babbitted end of the cable can pass over the crown block and need never be cut off. Dowel pins 14 fitting corresponding holes 14' facilitate the exact alignment of the halves 1 and 2 on the babbitted end of the cable.

The protective bushing 5 has annular ribs 15 for a fishing tool. Similar ribs 16 are provided on the shank 7 of the tool latch 8. The latter has clevis legs 17 for a tool, such as a bailer or clevis of traveling block. The legs 17 have slots 18 for a locking bridge bar 19 pivoted at 20 in one of the slots. The other end of the bar 19 rests in the other slot and can be locked in this position by a pin 21 passing through corresponding holes in the leg. The clevis can be placed over a handle or yoke (not shown) of a desired tool, the handle raising the bar 19, as shown in dotted lines in Fig. 1, until the bailer or clevis passes into the upper portion above the bar. The latter is then pushed back by a spring 22 and falls back into the locking position, the pin 21 can be then inserted if desired.

My cable socket can be used for various purposes, including attachment of wire lines on ships, cranes and other machinery used for lifting or lowering; also for trucks and winches using wire lines for loading and unloading. The split socket can be readily removed from the end of the cable, so that the latter can be then passed through different pulleys or blocks and various oil savers.

I have found that in oil well practice, using wire lines seven-eighths of an inch in diameter, satisfactory results are obtained with a socket one and thirteen-sixteenths of an inch in diameter, the end of the cable being cleaned from the hemp core, and the outer wires are doubled back at the length of seven inches. The babbitted end can be inspected by removing the socket and replacing it again.

The following sequence of operations, for instance, can be performed with my split socket without cutting the wire cable: After the blocks have been strung, the free babbitted end of the cable being passed over the blocks, the socket is replaced and the tool latch screwed into the socket.

The tool latch is attached to the clevis of traveling blocks for pulling sucker rods or tubing out of the well.

Upon completion of the last operation, the socket is removed from the babbitted end and the blocks are unstrung.

The split socket may be then again attached to the wire line and the tool latch hooked to a bailer for the bailing operation.

Upon completion of bailing, the socket can be again removed from the end of the cable, the blocks restrung, and the tubing and sucker rods replaced in the well.

For swabbing the well, sinker bars can be directly screwed into the coupling 4. Other tools can be screwed into the coupling for various other operations.

It is understood that my wire cable socket and tool latch may be further modified without departing from the spirit of the invention, as set forth in the appended claims.

I claim as my invention:

1. A wire cable socket comprising a cylindrical tubular member formed of longitudinal abutting portions, the ends of the tubular member being of a reduced diameter and threaded, tubular couplings screwed on the end of the tubular member, the couplings being of substantially the same outside diameter as the tubular member, the couplings extending beyond the ends of the tubular member for receiving elements of a well drilling equipment, the tubular member having a bore to fit a cable, the bore being enlarged at one end for an enlargement at the end of the cable.

2. A wire cable socket comprising a cylindrical tubular member formed of longitudinally abutting portions, the ends of the tubular member being of a reduced diameter and threaded, tubular couplings screwed on the end of the tubular member, the couplings being of substantially the same outside diameter as the tubular member, the couplings extending beyond the ends of the tubular member for receiving elements of a well drilling equipment, the tubular member having a bore to fit a cable, the bore being enlarged at one end for an enlargement at the end of the cable, and dowel pins at the sides of the abutting portions.

3. A wire cable socket comprising a cylindrical tubular member formed of longitudinally abutting portions, the ends of the tubular member being of a reduced diameter and threaded, tubular couplings screwed on the end of the tubular member, the couplings being of substantially the same outside diameter as the tubular member, the couplings extending beyond the ends of the tubular member for receiving elements of a well drilling equipment, the tubular member having a bore to fit a cable, the bore being enlarged at one end for an enlargement at the end of the cable, and a tubular plug screwed into the end of one coupling and having annular grooves.

4. A wire cable socket comprising a split tubular member consisting of a pair of like sections forming when united a tube of circular cross-section having a bore of relatively small cross-section at one end and of relatively large cross-section at its other end, defined from the smaller bore by a shoulder, said tubular member having reduced and externally threaded ends, an internally threaded sleeve screwed on each end of the tubular member, each sleeve extending beyond the respective threaded tube end, said smaller bore being of a diameter to receive a wire cable and the larger bore being of a diameter to receive the end of the cable with the strands of the cable unwound and bent back to lie against the adjacent part of the cable and the ends of the strands abutting the shoulder, and a tubular plug screwed into one of said sleeves and having a bore to receive the cable, the projecting end of the remaining sleeve being adapted to receive a threaded tool shank and the like.

5. A wire cable socket comprising a split tubular member consisting of a pair of like sections forming when united a tube of circular cross-section having a bore of relatively small cross-section at one end and of relatively large cross-section at its other end, defined from the smaller bore by a shoulder, said tubular member having reduced and externally threaded ends, an internally threaded sleeve screwed on each end of the tubular member, said sleeve extending beyond the respective threaded tube end, said smaller bore being of a diameter to receive a wire cable and the larger bore being of a diameter to receive the end of the cable with the strands of the cable unwound and bent back to lie against the adjacent part of the cable and the ends of the strands abutting the shoulder, and a tubular plug screwed into one of said sleeves and having a bore to receive the cable, the projecting end of the remaining sleeve being adapted to receive a threaded tool shank and the like, the external diameters of said sleeves and split tubular member being equal, and dowel pins carried by said sections, said sections having sockets receiving said dowel pins.

CONOR T. O'CONNOR.